US012804521B2

(12) United States Patent
Wu et al.

(10) Patent No.: US 12,804,521 B2
(45) Date of Patent: Nov. 17, 2026

(54) MOBILE DEVICE AND CONNECTION METHOD THEREOF AND ACCESS POINT

(71) Applicant: WISTRON CORP., New Taipei City (TW)

(72) Inventors: Chen Hsien Wu, New Taipei City (TW); Kuo Chung Chu, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 312 days.

(21) Appl. No.: 18/656,761

(22) Filed: May 7, 2024

(65) Prior Publication Data

US 2025/0287292 A1 Sep. 11, 2025

(30) Foreign Application Priority Data

Mar. 7, 2024 (TW) ................................ 113108390

(51) Int. Cl.
*H04W 48/14* (2009.01)
*H04W 76/10* (2018.01)

(52) U.S. Cl.
CPC ........... *H04W 48/14* (2013.01); *H04W 76/10* (2018.02)

(58) Field of Classification Search
CPC ..... H04W 48/20; H04W 48/14; H04W 48/16; H04W 48/08; H04W 48/02; H04W 76/10; H04W 76/00; H04W 76/20
See application file for complete search history.

(56) References Cited

U.S. PATENT DOCUMENTS 8,630,220 B2 1/2014 Umeuchi
8,711,968 B2 4/2014 Seok
9,648,550 B2 5/2017 Zhao et al.
2013/0107756 A1 5/2013 Lai
2015/0173002 A1* 6/2015 Nakagawa ............ H04W 48/16 455/435.2
2016/0286530 A1* 9/2016 Ishimura ............... H04L 67/141
2018/0054845 A1* 2/2018 Lee ....................... H04W 48/14
2018/0288820 A1* 10/2018 Shibata ................. H04W 76/14
2019/0014609 A1* 1/2019 Asakura ................ G06F 3/1204
2020/0089446 A1* 3/2020 Shiotani ................ G06F 3/1209
2020/0169953 A1* 5/2020 Sekiguchi ............... H04L 63/00
2021/0090080 A1* 3/2021 Kang .................. H04W 12/065
2021/0100045 A1* 4/2021 Tsuji ..................... H04W 76/11
(Continued)

FOREIGN PATENT DOCUMENTS

CN 102461278 B 2/2015
CN 102647771 B 5/2016
(Continued)

OTHER PUBLICATIONS

TW Office Action dated Sep. 16, 2025 in Taiwan application No. 113108390.
(Continued)

*Primary Examiner* — Phong La
(74) *Attorney, Agent, or Firm* — McClure, Qualey & Rodack, LLP

(57) ABSTRACT

A mobile device connection method includes: sending a probe request by a mobile device, receiving at least one probe response associated with the probe request by the mobile device, and outputting a connection signal according to the at least one probe response by the mobile device.

19 Claims, 6 Drawing Sheets

(56) References Cited

U.S. PATENT DOCUMENTS

| | | | | |
|---|---|---|---|---|
| 2021/0176703 | A1* | 6/2021 | Shibuya | H04W 76/10 |
| 2021/0204204 | A1* | 7/2021 | Kim | H04W 48/10 |
| 2023/0209454 | A1* | 6/2023 | Yoon | H04W 48/18 370/329 |
| 2025/0168741 | A1* | 5/2025 | Tanaka | H04W 76/10 |

FOREIGN PATENT DOCUMENTS

| | | | |
|---|---|---|---|
| CN | 109309657 | B | 6/2021 |
| CN | 116996414 | A | 11/2023 |
| TW | 200937971 | A | 9/2009 |
| TW | 201318466 | A | 5/2013 |
| TW | I818802 | B | 10/2023 |

OTHER PUBLICATIONS

TW Office Action dated Jan. 9, 2025 in Taiwan application No. 113108390.

* cited by examiner

MOBILE DEVICE AND CONNECTION METHOD THEREOF AND ACCESS POINT

CROSS-REFERENCE TO RELATED APPLICATIONS

This non-provisional application claims priority under 35 U.S.C. § 119(a) on Patent Application No(s). 113108390 filed in Taiwan on Mar. 7, 2024, the entire contents of which are hereby incorporated by reference.

BACKGROUND

1. Technical Field

The present disclosure relates to communication connections in wireless networks, particularly to a mobile device, an access point, and a method for establishing communication between the mobile device and the access point.

2. Related Art

In existing wireless communication connections, the mobile device prioritizes automatically connecting to the access point (AP) that an user have previously manually connected to.

However, the common scenario is that the user only discovers after the mobile device has connected to the access point that the access point cannot provide internet access. Whenever this situation occurs, the user must reconfigure the Wi-Fi connection, causing inconvenience in usage. Another scenario is when applications or websites are blocked by firewalls or other network factors, and the mobile device has already connected to an access point that does not support these conditions, resulting in the user spending a lot of time manually switching Wi-Fi connections, causing many inconveniences. In other words, the existing problem is that mobile devices cannot confirm the connectivity of an access point before connecting to it, nor can they automatically switch to an access point with connectivity.

SUMMARY

According to one or more embodiment of the present disclosure, a mobile device connection method includes: sending a probe request by a mobile device; receiving at least one probe response associated with the probe request by the mobile device; and outputting a connection signal by the mobile device according to the at least one probe response.

According to one or more embodiment of the present disclosure, an access point includes a communication circuit and a computing circuit. The communication circuit is configured to receive a probe request, connect to a connection target, send a probe response, and establish a communication connection to a mobile device, where the probe request includes a connection requirement and the connection target. The computing circuit is electrically connected to the communication circuit, where the computing circuit is configured to extract the connection requirement and the connection target from the probe request, control the communication circuit to connect to the connection target to confirm a connection result, wherein the connection result is configured to indicate whether the access point is available to connect to the connection target, the computing circuit is further configured to record the connection result in the probe response, and control the communication circuit to establish the communication connection to the mobile device when the connection result is connection available.

According to one or more embodiment of the present disclosure, a mobile device includes a communication circuit, a storage circuit, and a computing circuit. The communication circuit is configured to send a probe request, receive at least one probe response, and establish a communication connection to one of at least one access point, wherein the probe request comprises a connection requirement and a connection target. The storage circuit is configured to store a plurality of instructions. The computing circuit is electrically connected to the communication circuit and the storage circuit, wherein the computing circuit is configured to execute the plurality of instructions to perform a plurality of operations, wherein the plurality of operations comprises: adding the connection requirement and the connection target to the probe request, and establishing the communication connection to one of the at least one access point according to a connection result recorded in the at least one probe response

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
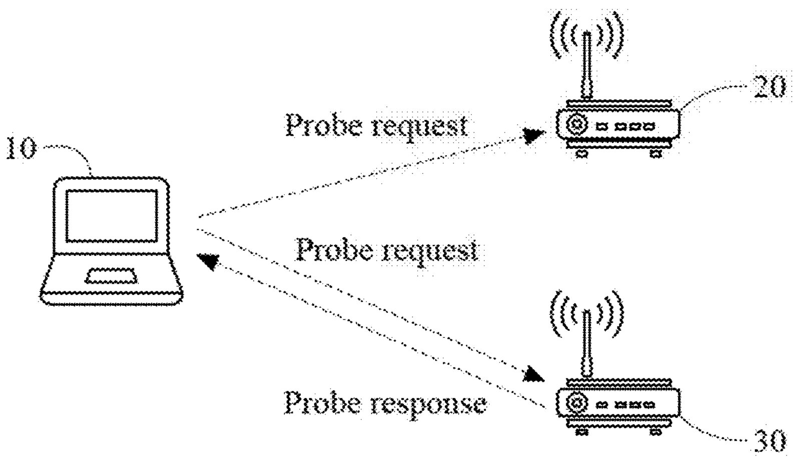
FIG. 1 is a schematic diagram of the relationship between a mobile device and at least one access point.

FIG. 1 is a schematic diagram of the relationship between a mobile device and at least one access point. In the example of FIG. 1, the mobile device 10 broadcasts a probe request. Each of the access points 20, 30 receives the probe request and sends probe responses to the mobile device 10. FIG. 1 shows only two access points 20, 30 for illustrative purposes, but the present disclosure is not limited to the number of access points.

Figure 2:
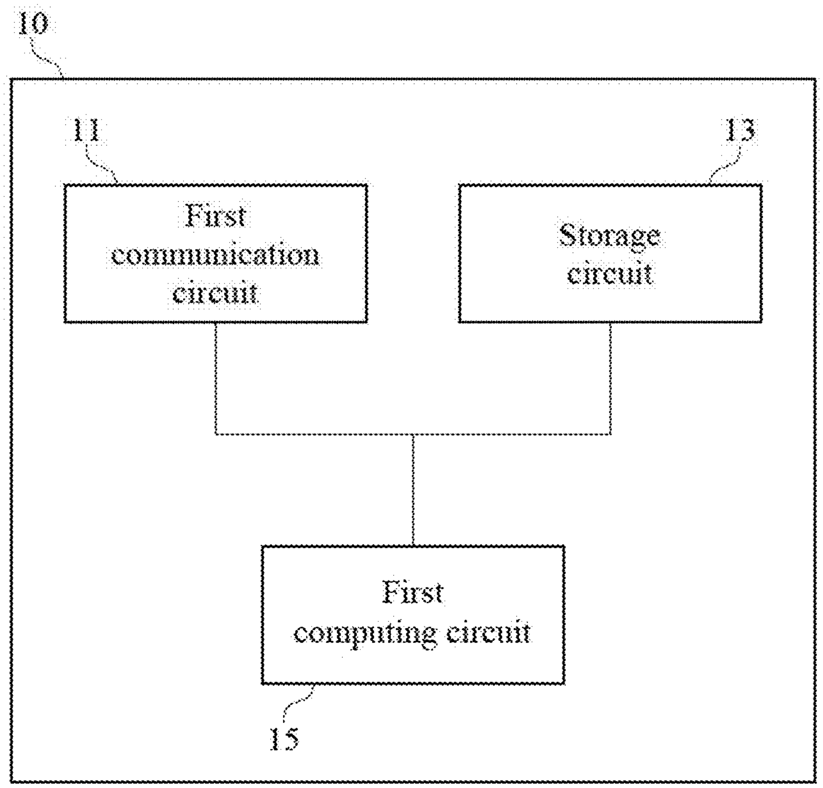
FIG. 2 is a block diagram of the architecture of a mobile device according to an embodiment of the present disclosure.

FIG. 2 is a block diagram of the architecture of a mobile device 10 according to an embodiment of the present disclosure. In an embodiment, the mobile device 10 may be a smartphone, tablet, laptop, or any wireless communication device with internet access requirements. The term "mobile device" is not limited to a specific hardware type in the present disclosure.

As shown in FIG. 2, the mobile device 10 includes a first communication circuit 11, a storage circuit 13, and a first computing circuit 15. The first communication circuit 11 is configured to send a probe request. The probe request includes a connection requirement and a connection target. The first communication circuit 11 is further configured to receive a probe response from each of the plurality of access points 20, 30 and establish a communication connection to one of the plurality of access points 20, 30. The storage circuit 13 is configured to store a plurality of instructions. The first computing circuit 15 is electrically connected to the first communication circuit 11 and the storage circuit 13.

The first computing circuit 15 is configured to execute the plurality of instructions stored in the storage circuit 13 to perform a plurality of operations, which will be described in detail later when discussing embodiments of the method for the mobile device to connect to the access point.

Figure 3:
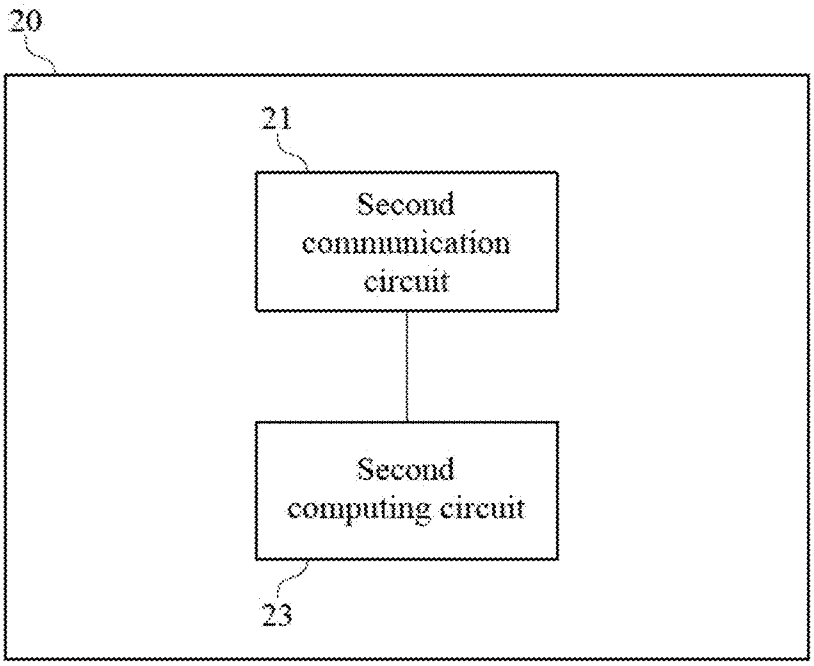
FIG. 3 is a block diagram of the architecture of an access point according to an embodiment of the present disclosure.

FIG. 3 is a block diagram of the architecture of an access point according to an embodiment of the present disclosure, using the access point 20 as an example. The internal architecture of the access point 30 is essentially the same as the access point 20. As shown in FIG. 3, the access point 20 includes a second communication circuit 21 and a second computing circuit 23. The second communication circuit 21 is configured to receive the probe request, connect to the connection target included in the probe request, send the probe response, and establish a communication connection to the mobile device 10.

The second computing circuit 23 is electrically connected to the second communication circuit 21. The second computing circuit 23 is configured to extract the connection requirement and the connection target from the probe request, control the second communication circuit 21 to connect to the connection target to confirm the connection result, where the connection result indicates whether the access point 20 can connect to the connection target. The second computing circuit 23 is further configured to record the connection result in the probe response and, when the connection result is connection available, control the second communication circuit 21 to establish a communication connection to the mobile device 10.

In an embodiment, the first communication circuit 11 and the second communication circuit 21 may be implemented by at least one of the following examples: network chips, network cards, and communication chips, and support wireless communication standards. However, the present disclosure is not limited to the examples mentioned above.

In an embodiment, the storage circuit 13 may be implemented by at least one of the following examples: flash memory, hard disk drive (HDD), solid-state drive (SSD), dynamic random-access memory (DRAM), static random-access memory (SRAM), or other non-volatile memory. However, the present disclosure is not limited to the examples mentioned above.

In an embodiment, the first computing circuit 15 and the second computing circuit 23 may be implemented by at least one of the following examples: microcontrollers (MCU), application processors (AP), field-programmable gate arrays (FPGA), application-specific integrated circuit (ASIC) system-on-a-chip (SOC), deep learning accelerators, or any electronic devices with similar functions. However, the present disclosure is not limited to the examples mentioned above.

Figure 4:
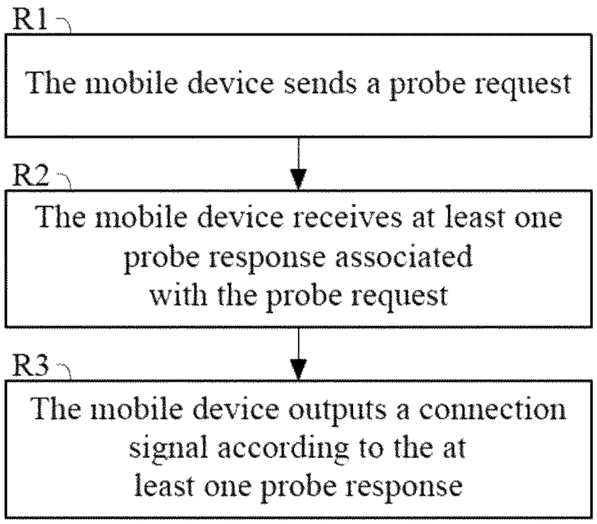
FIG. 4 is a flowchart of a mobile device connection method according to an embodiment of the present disclosure.

FIG. 4 is a flowchart of a mobile device connection method according to an embodiment of the present disclosure, including steps R1 to R3. The focus of this method is that the mobile device 10 may automatically switch to an access point (such as the access point 20) with connectivity.

In step R1, the mobile device 10 sends a probe request. In step R2, the mobile device 10 receives at least one probe response associated with the probe request. In step R3, the mobile device 10 outputs a connection signal according to the at least one probe response.

In an embodiment, the probe request includes a connection requirement and a connection target. The at least one probe response is generated by the at least one access point 20, 30 and includes a connection result. The connection result indicates whether the at least one access point 20, 30 can connect to the connection target.

In an embodiment, the mobile device connection method further includes the following steps: the mobile device 10 sends an authentication request including a password to at least one candidate access point (such as 20) with network connectivity among the at least one access point 20, 30; the mobile device 10 receives an authentication response associated with the authentication request, and when the authentication response indicates that the password is accepted, the mobile device establishes a communication connection to the at least one candidate access point.

In an embodiment, the number of the at least one candidate access points is plural, and the mobile device connection method further includes: the mobile device 10 establishes a communication connection to the candidate access point having the maximum signal strength among the at least one candidate access point.

In an embodiment, the probe request and probe response are in MPDU format. In an embodiment, the connection requirement is recorded in the Duration/ID field of the MPDU format, and the connection target is recorded is recorded in ASCII format in a Frame Body field of the MPDU format.

In an embodiment, the connection target is a Uniform Resource Locator (URL).

Figure 5:
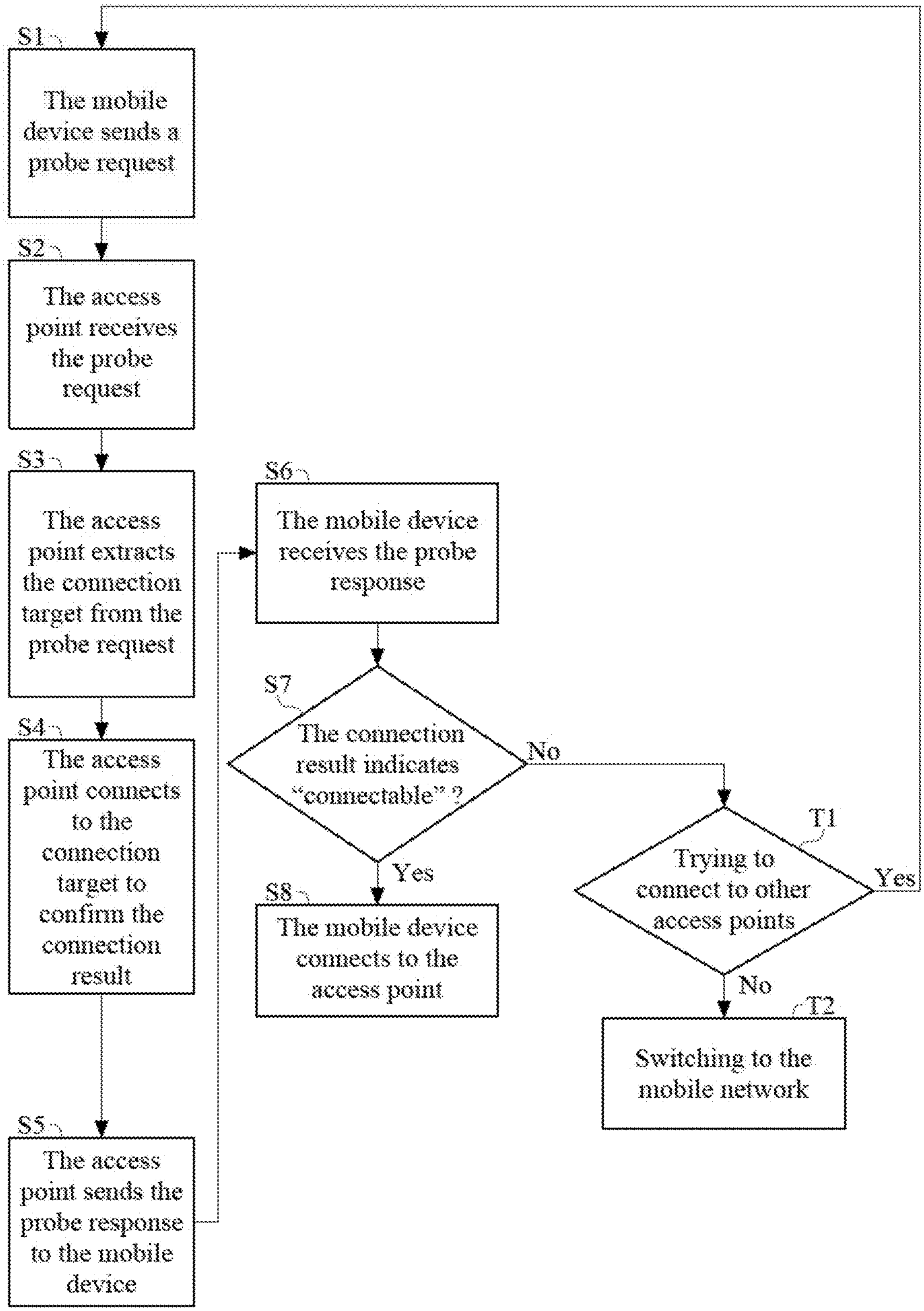
FIG. 5 is a flowchart of a method for a mobile device to connect to an access point according to a first embodiment of the present disclosure.

FIG. 5 is a flowchart of a method for a mobile device to connect to an access point according to a first embodiment of the present disclosure, including steps S1 to S8 and steps T1 to T2. The feature of this method is to obtain in advance the connection results of all access points 20, 30 to the connection target before confirming the establishment of communication connection. The following describes the implementation details of each step in chronological order.

In step S1, the mobile device 10 sends a probe request. In step S2, each of the access points 20, 30 receives the probe request. In an embodiment of IEEE 802.11 standard, to find a connectable access point (such as access points 20 or 30), the user obtains a list of nearby access points through the mobile device 10's wireless network (Wi-Fi) function or related Application Programming Interfaces (APIs). At this time, the mobile device 10 sends probe requests by active scan to inquire if there is a connectable Basic Service Set (BSS) nearby. When the access points 20, 30 receive the probe request packets, each of them returns a probe response packet to the mobile device 10.

In step S3, each of the access points 20, 30 extracts the connection target from the probe request. In step S4, each of the access points 20, 30 connects to the connection target to confirm the connection result, which includes "connectable (connection available)" and "not connectable (connection unavailable)".

In an embodiment, the connection target is a URL, and the access points 20, 30 use a TCP/IP three-way handshake technology to confirm whether they can connect to the URL. In another embodiment, if firewall security issues are not considered, the URL can also be confirmed to be connectable using ping.

In an embodiment, the probe request and the probe response are in MPDU format. MPDU stands for MAC Protocol Data Unit, where MAC stands for Media Access Control. The MPDU format consists of three parts: Header, Frame Body, and Frame Check Sequence. Table 1 presents the MPDU format and indicates the length of each field (unit: bytes).

TABLE 1

MPDU format.

| 2 | 2 | 6 | 6 | 6 | 2 | 6 | 0-2312 | 4 |
|---|---|---|---|---|---|---|---|---|
| Frame Control | Duration/ ID | Address1 | Address2 | Address3 | Sequence Control | Address4 | Frame Body | CRC |
| | | | Header | | | | | |

The length of the Header is 30 bytes, including fields such as Frame Control, Duration/ID, Address 1-4, and Sequence Control. The length of the Frame Body ranges from 0 to 2312 bytes, depending on the type of Frame. The length of the Frame Check Sequence is 4 bytes, utilizing CRC-32 checksum.

Table 2 presents the format of Frame Control, indicating the length of each field (unit: bits).

TABLE 2

Frame Control Format.

| 2 | 2 | 4 | 1 | 1 | 1 | 1 | 1 | 1 | 1 | 1 |
|---|---|---|---|---|---|---|---|---|---|---|
| Protocol Version | Type | Subtype | ToDS | FromDS | MoreFrag | Retry | PwrMgt | MoreData | WEP | Order |

When using the probe request and the probe response, the corresponding Type and Subtype fields are as shown in Table 3 below.

TABLE 3

Format of probe request and probe response.

| Type value | Type Desciption | Subtype value | Subtype Description |
|---|---|---|---|
| 00 | Management | 0100 | Probe Request |
| 00 | Management | 0101 | Probe Response |

As mentioned earlier, the second computing circuit 23 in the access point 20 can extract the connection requirement and the connection target from the probe request. The present disclosure utilizes reserved bits in the Duration/ID field of MPDU to implement the connection requirement and uses the Frame Body field to record the connection target (such as a URL). The Duration/ID field is 16 bits long and is configured to store Duration or Association ID (AID). Table 4 below displays the value definitions of the Duration/ID field.

TABLE 4 value definitions of the Duration/ID Field.

| Bit 15 | Bit 14 | Bit 13-0 | Definition |
|---|---|---|---|
| 0 | 0-32767 | | Duration value |
| 1 | 0 | 0 | Transmitting a fixed value during the non-contention period |
| 1 | 0 | 1-16383 | Reserved |
| 1 | 1 | 0 | Reserved |
| 1 | 1 | 1-2007 | AID in PS-Poll frames |
| 1 | 1 | 2008-16383 | Reserved |

The present disclosure defines the connection requirement and its response as shown in Table 5 below. Specifically, in step S1, the first computing circuit 15 of the mobile device 10 fills in "1 0 1 1" in Bit 15-12 of the Duration/ID field in the probe request in MPDU format to represent the connection requirement, and fills in the URL as the connection target in ASCII format in the Frame Body field (the example is shown in Table 6). In step S3, when each of the access points 20, 30 extracts the connection requirement from the Duration/ID field of the probe request, each of them will continue to extract the connection target from the Frame Body field as shown in Table 6.

TABLE 5 value definitions of the connection requirement and response.

| Bit 15 | Bit 14 | Bit 13 | Bit 12 | Definition |
|---|---|---|---|---|
| 1 | 0 | 1 | 1 | Probe Request (URL capability Request) |
| 1 | 0 | 1 | 0 | Probe Response (URL capability Response) |

TABLE 6 values of the connection target, using www.google.com as an example.

| Frame Body |
|---|
| 00 00 00 00 00 00 00 00 . . . 77 77 77 2E 67 6F 6F 67 6C 65 2E 63 6F 6D |

In step S5, each of the access points 20, 30 sends the probe response to the mobile device 10 according to the connection result. In step S6, the mobile device 10 receives probe responses sent by all access points 20, 30. The probe response records the response to the connection requirement and the connection result. As shown in Table 5, the second computing circuit 23 of the access point 20 may fill in "1 0 1 0" in Bit 15-12 of the Duration/ID field in the probe response in MPDU format to represent the response to the connection request, and fill in 0 or 1 in the Frame Body to represent the connection result. Examples of the connection result value definitions are shown in Table 7.

TABLE 7 examples of value definitions of the connection result.

| Frame Body | Definition |
|---|---|
| 00 00 00 00 00 00 00 00 . . . 00 | The access point can't connect to the connection target. |
| 00 00 00 00 00 00 00 00 . . . 01 | The access point can connect to the connection target. |

In step S7, when the first computing circuit 15 in the mobile device 10 extracts the response to the connection request from the Duration/ID field of the MPDU-formatted probe response, it continues to extract the connection result from the Frame Body field. If the connection result indicates "connectable", step S8 is performed next, where the mobile device 10 connects to one of the access points 20, 30.

In an embodiment of step S8, if only one access point (e.g., the access point 20) has a connection result indicating "connectable", while the connection results of the other access points (e.g., the access point 30) are all indicating "not connectable", then the mobile device 10 establishes a communication connection to the access point (e.g., access point 20) having the connectivity.

In another embodiment of step S8, if multiple access points (e.g., access points 20, 30) have connection results indicating "connectable", the mobile device 10 sorts these available access points (e.g., access points 20, 30) from highest to lowest signal strength for the user to select one to establish a communication connection. The mobile device 10 can also automatically select the access point (e.g., the access points 20, 30) with the maximum signal strength. The signal strength information (Received Signal Strength Indication, RSSI) is present in the Physical Layer packets and can be represented in Signal to Noise (SNR) ratio in decibel milliwatts (dBm).

In step S7, if the connection result indicates "not connectable", step T1 is performed next and the user is asked whether to try to connect to other access points besides access points 20 and 30. If the determination in step T1 is yes, return to step S1 to rerun the above process. If the determination in step T1 is no, step T2 is performed next and the user is asked whether to switch to mobile network, i.e., not connecting to the internet through access points 20, 30. In an embodiment, steps T1 and T2 are implemented through a graphical user interface (GUI) of an application running on the mobile device 10, without limitation by the present disclosure.

Figure 6:
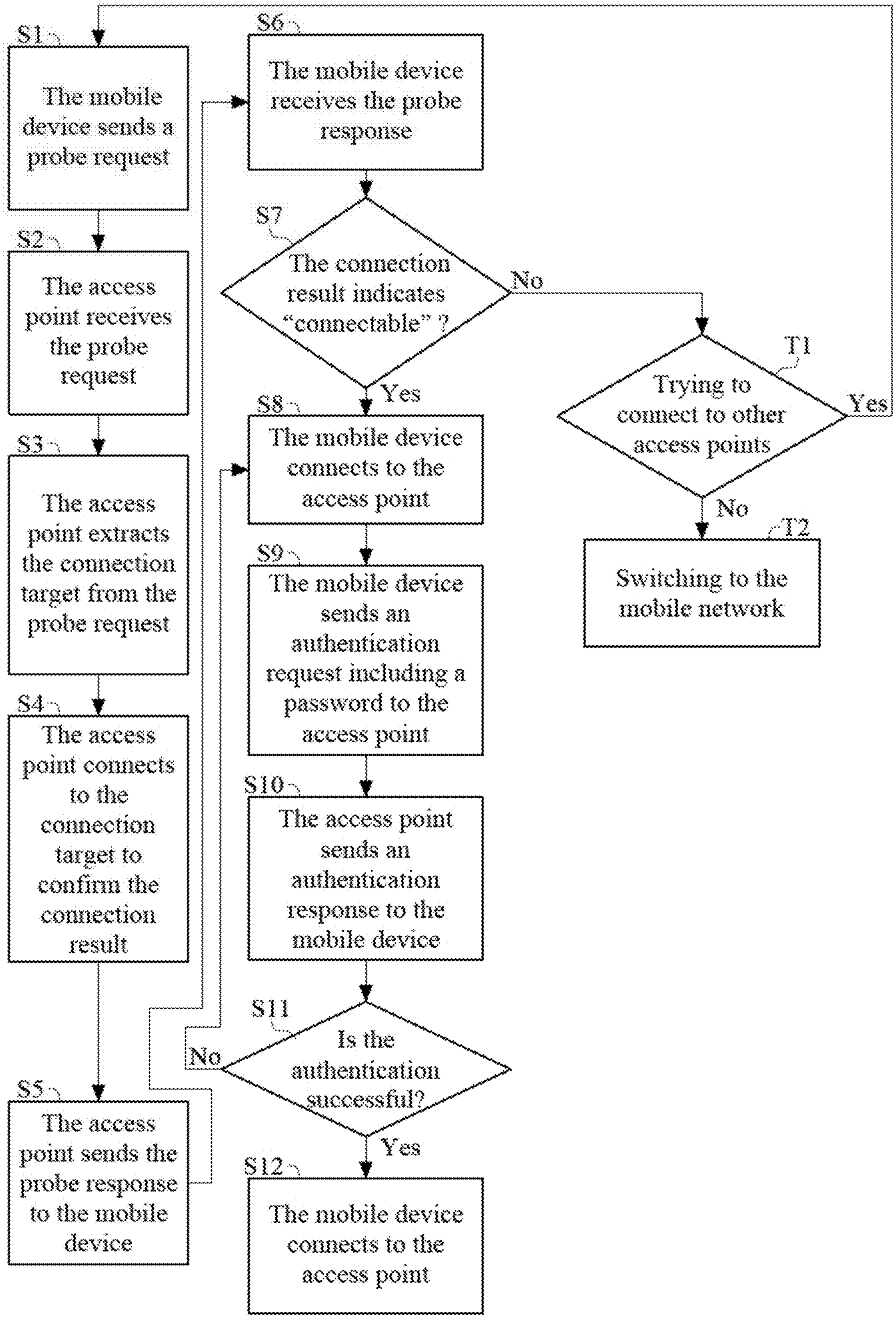
FIG. 6 is a flowchart of a method for a mobile device to connect to an access point according to a second embodiment of the present disclosure.

FIG. 6 is a flowchart of a method for a mobile device 10 to connect to an access point according to a second embodiment of the present disclosure. Compared to the first embodiment, the second embodiment includes additional steps S9 to S12 after step S8. The scenario is as follows: After the user selects the access point to establish the communication connection, the mobile device 10 performs password authentication with the selected access point (using the access point 20 as an example). Only when the password authentication is successful will the mobile device 10 establish the communication connection to the access point 20.

In step S9, the mobile device 10 sends an authentication request including the password to the access point 20. In step S10, the access point 20 sends an authentication response to the mobile device 10. In step S11, the mobile device 10 confirms whether the password authentication is successful based on the authentication response. If the password authentication is successful, step S12 is performed next. In step S12, the mobile device 10 establishes the communication connection to the access point 20. If the password authentication fails in step S11, then return to step S8, allowing the user to re-enter the password or choose another access point (such as the access point 30).

In an embodiment, the process from step S9 to step S12 may be implemented using open system authentication. Overall, before the mobile device 10 connects to the access point 20, it sends the authentication request to the access point 20, and the access point 20 responds with the authentication response. Next, the mobile device 10 sends an association request to the access point 20, and the access point 20 replies with an association response, after which the communication connection (association) between the mobile device 10 and the access point 20 can be confirmed.

Figure 7:
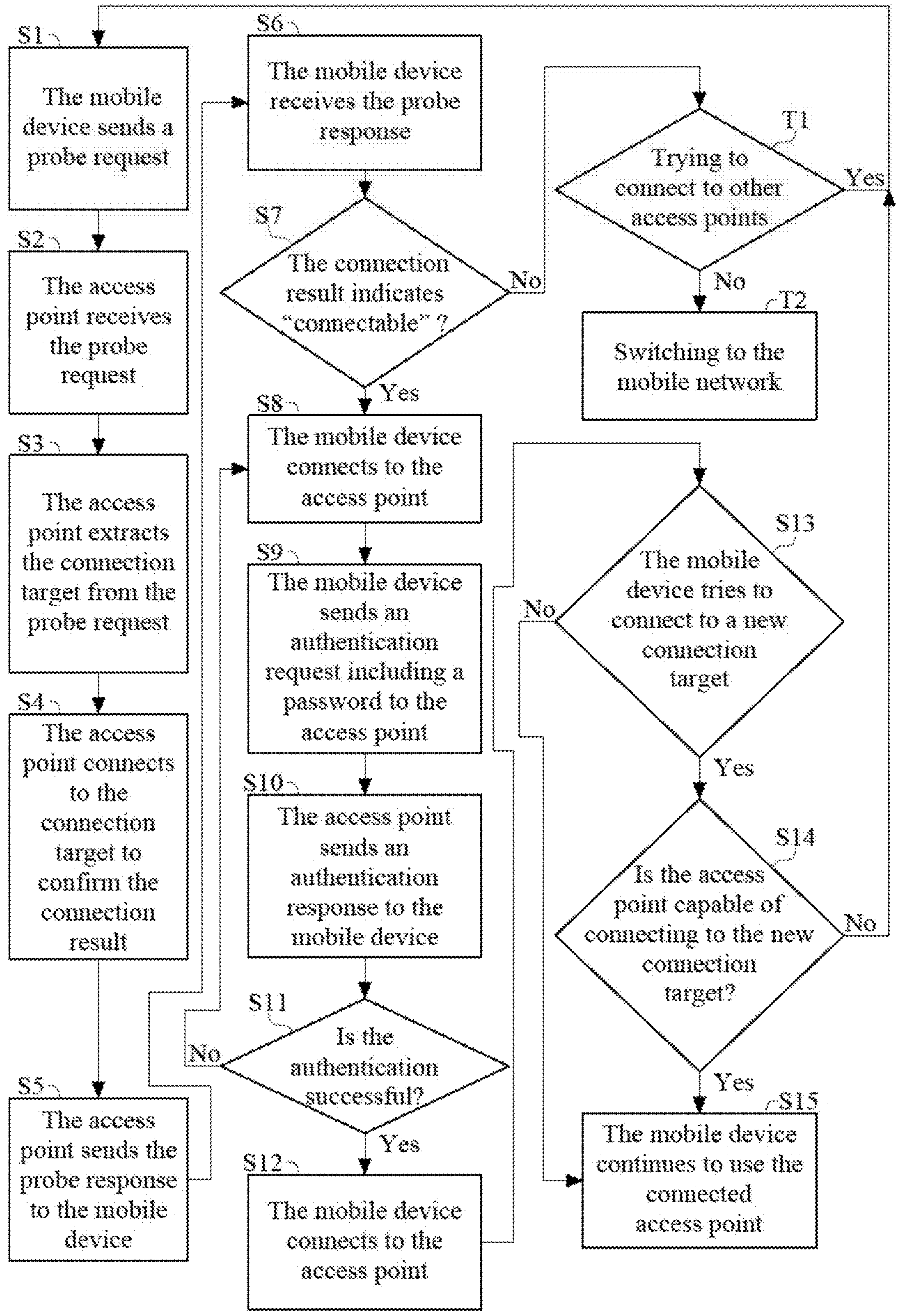
FIG. 7 is a flowchart of a method for a mobile device to connect to an access point according to a third embodiment of the present disclosure.

FIG. 7 is a flowchart of a method for a mobile device 10 to connect to an access point according to a third embodiment of the present disclosure. Compared to the second embodiment, the third embodiment includes additional steps S13 to S15 after step S12. The scenario is as follows: after the user's mobile device 10 has established the communication connection to the access point 20 (using the access point 20 as an example), the user enters a new connection target (URL) and performs a communication connection through the access point 20. If the connection is successful, the current access point 20 will continue to be used for communication; otherwise, another access point capable of connecting to the new connection target (such as the access point 30) will be searched.

In step S13, the first computing circuit 15 in the mobile device 10 determines whether the user has entered a new connection target. If the determination is yes, the first computing circuit 15 controls the first communication circuit 11 to send a new connection request to the access point (such as the access point 20), and step S14 is performed next. If the determination is no, step S15 is performed next.

In step S14, the second computing circuit 23 of the access point 20 extracts the new connection target from the new connection request and controls the second communication circuit 21 to connect to the new connection target. If the connection is successful, step S15 is performed next. If the connection fails, step S1 is performed next.

When step S15 is performed, it means that access point 20 can connect to the new connection target, so the mobile device 10 continues to use the connected access point 20.

In view of the above, the mobile device, access point, and method for the mobile device to connect to the access point proposed by the present disclosure allow the mobile device to search for nearby access points based on the environment and further confirm whether the searched access point is connectable before connecting to the access point. The present disclosure may effectively improve the connectivity availability of mobile devices and provide a better user experience.

What is claimed is:

1. A mobile device connection method comprising:

sending a probe request by a mobile device;

receiving at least one probe response associated with the probe request by the mobile device; and outputting a connection signal by the mobile device according to the at least one probe response;

wherein the probe request comprises a connection requirement and a connection target, the at least one probe response is generated by at least one access point and comprises a connection result, the connection result is configured to indicate whether the at least one access point is available to connect to the connection target.

2. The mobile device connection method of claim 1, wherein the probe request and the probe response are in MPDU format.

3. The mobile device connection method of claim 2, wherein the connection requirement is recorded in a Duration/ID field of the MPDU format, and the connection target is recorded in ASCII format in a Frame Body field of the MPDU format.

4. The mobile device connection method of claim 1, wherein the connection target is a uniform resource locator.

5. The mobile device connection method of claim 1, further comprising:

sending an authentication request including a password by the mobile device to at least one candidate access point with a network connectivity in the at least one access point;

receiving an authentication response associated with the authentication request by the mobile device; and establishing, by the mobile device, a communication connection between the mobile device and the at least one candidate access point when the authentication response indicates that the password is accepted.

6. The mobile device connection method of claim 5, wherein a number of the at least one candidate access points is plural, and the method further comprises:

establishing, by the mobile device, the communication connection between the mobile device and one with a maximum signal strength among the at least one candidate access points.

7. An access point comprising:

a communication circuit configured to receive a probe request, connect to a connection target, send a probe response, and establish a communication connection to a mobile device, wherein the probe request includes a connection requirement and the connection target, the probe response is generated by the access point and comprises a connection result; and a computing circuit electrically connected to the communication circuit, wherein the computing circuit is configured to extract the connection requirement and the connection target from the probe request, control the communication circuit to connect to the connection target to confirm the connection result, wherein the connection result is configured to indicate whether the access point is available to connect to the connection target, the computing circuit is further configured to record the connection result in the probe response, and control the communication circuit to establish the communication connection to the mobile device when the connection result is connection available.

8. The access point of claim 7, wherein the communication circuit is further configured to receive an authentication request including a password from the mobile device, the computing circuit is further configured to perform a determination according to the password, and control the communication circuit to send an authentication response to the mobile device, wherein the authentication response indicates whether the password is accepted.

9. The access point of claim 7, wherein the computing circuit is further configured to record signal strength in the probe response.

10. The access point of claim 7, wherein the probe request and the probe response are in MPDU format.

11. The access point of claim 10, wherein the connection requirement is recorded in a Duration/ID field of the MPDU format, and the connection target is recorded in ASCII format in a Frame Body field of the MPDU format.

12. The access point of claim 7, wherein the connection target is a uniform resource locator.

13. The access point of claim 12, wherein the communication circuit performs a TCP/IP three-way handshake based on the uniform resource locator to confirm the connection result.

14. A mobile device comprising:

a communication circuit configured to send a probe request, receive at least one probe response, and establish a communication connection to one of at least one access point, wherein the probe request comprises a connection requirement and a connection target, the at least one probe response is generated by at least one access point and comprises a connection result, the connection result is configured to indicate whether the at least one access point is available to connect to the connection target;

a storage circuit configured to store a plurality of instructions; and a computing circuit electrically connected to the communication circuit and the storage circuit, wherein the computing circuit is configured to execute the plurality of instructions to perform a plurality of operations, wherein the plurality of operations comprises: adding the connection requirement and the connection target to the probe request, and establishing the communication connection to one of the at least one access point according to the connection result recorded in the at least one probe response.

15. The mobile device of claim 14, wherein when the connection result of one candidate access point among the at least one access point indicates that the one candidate access point is connectable, the computing circuit is further configured to control the communication circuit to establish the communication connection to the candidate access point.

16. The mobile device of claim 14, wherein the communication circuit is further configured to send an authentication request and receive an authentication response, the computing circuit is further configured to control the communication circuit to send the authentication request including a password, when the connection result of one candidate access point among the at least one access point indicates that the one candidate access point is connectable and the authentication response received by the communication circuit indicates that the password is accepted, the computing circuit is further configured to control the communication circuit to establish the communication connection to the one candidate access point.

17. The mobile device of claim 14, wherein among the at least one access point, when there are a plurality of candidate access points whose connection results indicate that the plurality of candidate access points are connectable, the computing circuit is further configured to control the communication circuit to establish the communication connection to one with the strongest signal strength among the plurality of candidate access points.

18. The mobile device of claim 14, wherein the probe request and the probe response are in MPDU format.

19. The mobile device of claim 14, wherein the connection requirement is recorded in a Duration/ID field of MPDU format, and the connection target is recorded in ASCII format in a Frame Body field of MPDU format.

* * * * *